Patented Nov. 20, 1923.

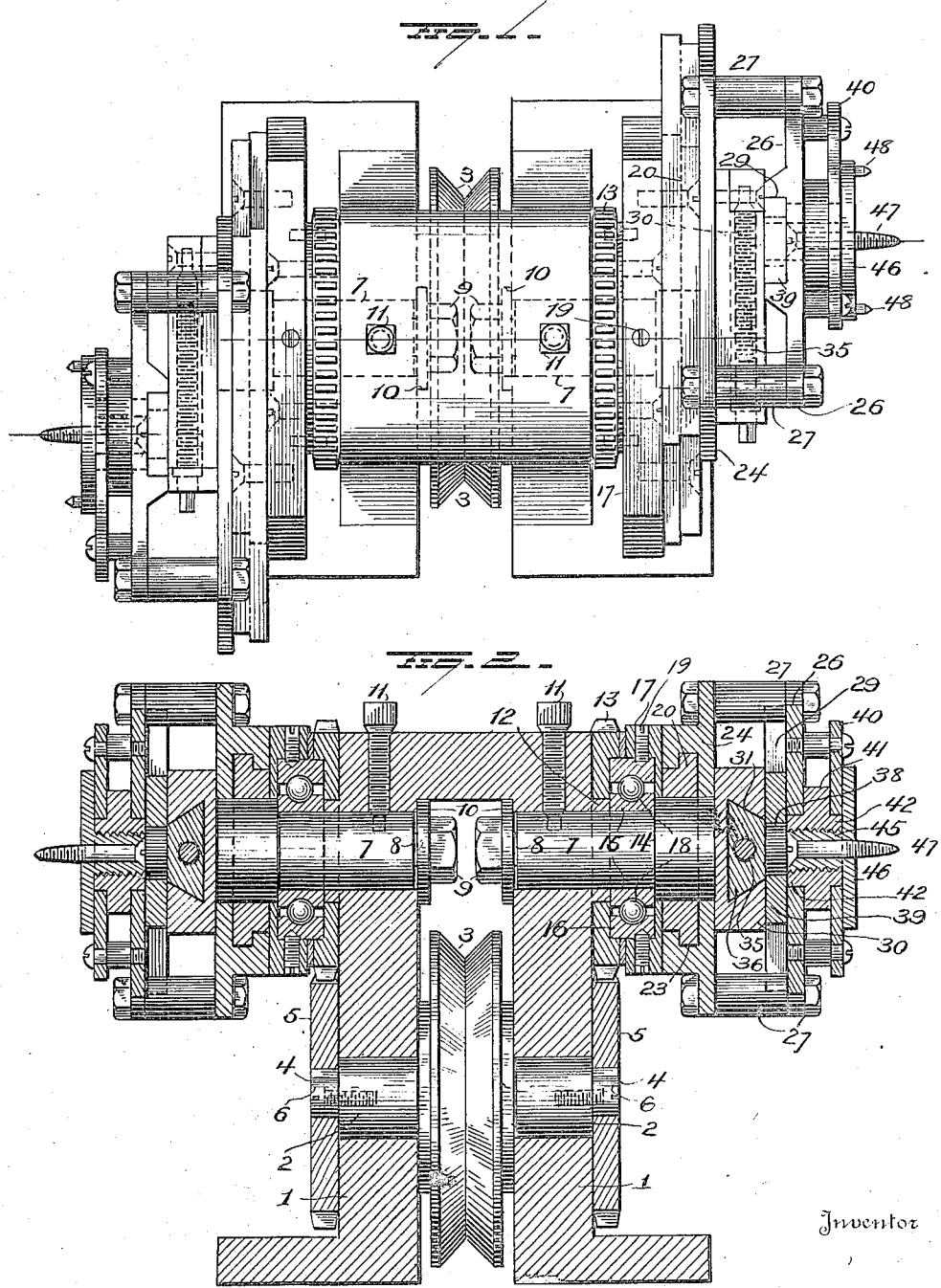

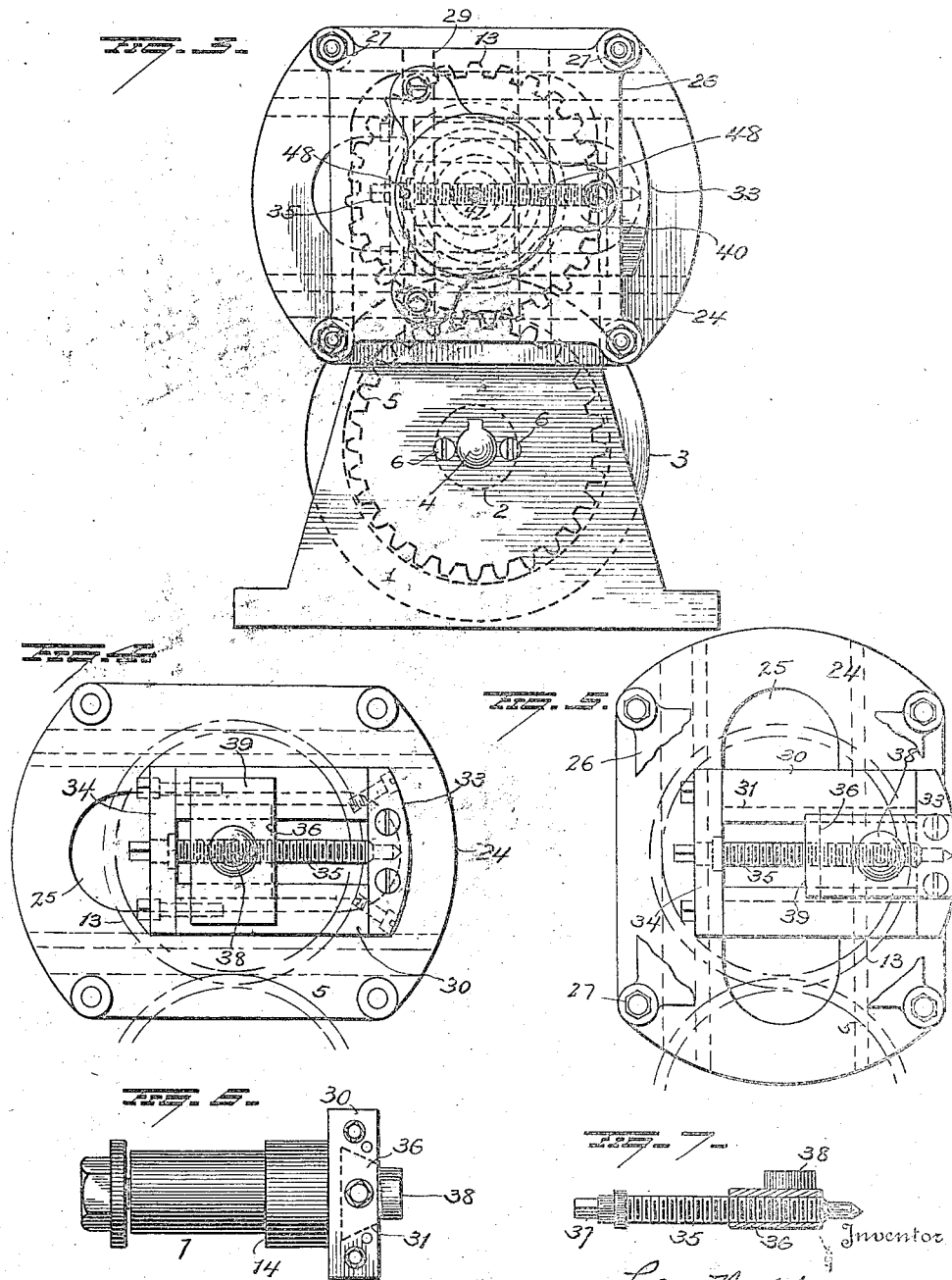

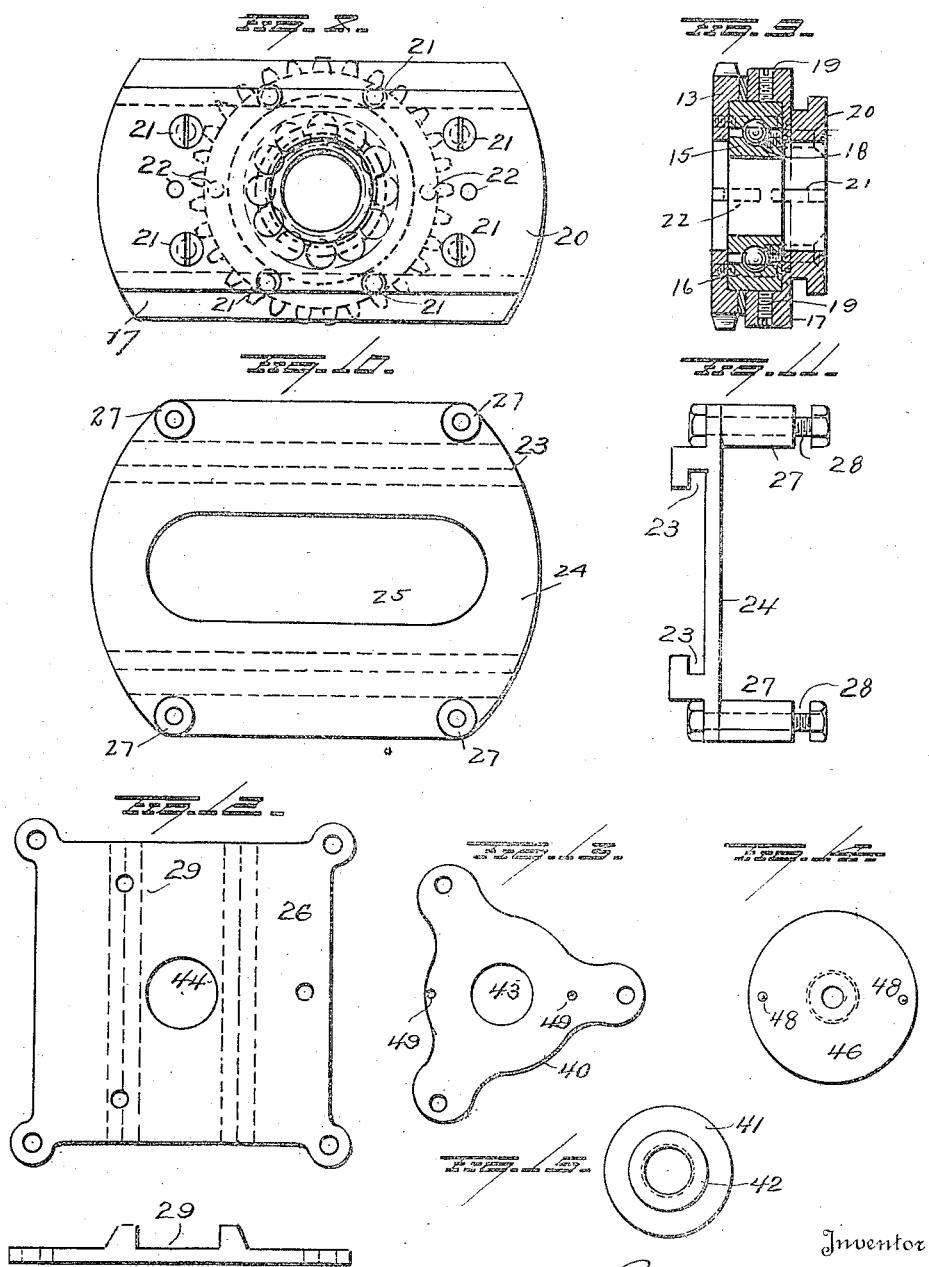

1,474,869

UNITED STATES PATENT OFFICE.

LEWIS M. WALKER, OF CRANSTON, RHODE ISLAND.

TURNING HEAD FOR LATHES.

Application filed December 27, 1921. Serial No. 524,914.

*To all whom it may concern:*

Be it known that I, LEWIS M. WALKER, a citizen of the United States, and a resident of Cranston, in the county of Providence and State of Rhode Island, have invented certain new and useful Improvements in Turning Heads for Lathes; and I do hereby declare the following to be a full, clear, and exact description of the invention, such as will enable others skilled in the art to which it appertains to make and use the same.

This invention relates to improvements in turning heads for lathes,—one object of the invention being to provide a simple construction in which the part which carries the work may be caused accurately to move in an elliptical path and thus cause the tool to cut, mark or operate upon an object, a shape corresponding to the path of travel of the work.

A further object is to so construct the mechanism that it may be easily adjusted to cause the work holding member to travel in paths marking ellipses of different major and minor dimensions.

A further object is to so construct a lathe head of the character specified that the mechanism shall be accurately balanced.

With these and other objects in view, the invention consists in certain novel features of construction and combinations of parts as hereinafter set forth and pointed out in the claims.

In the drawings, Fig. 1 is a plan view of a machine embodying the invention,

Fig. 2 is a longitudinal section of the same,

Fig. 3 is an end view of the same,

Figs. 4 and 5 are elevations of the inner slide plate, the head, and the pivot member associated therewith showing different relative positions of the parts, Fig. 6 is a detail elevation of one of the supporting rods, Fig. 7 is an elevation, partly in section, of one end of the structure shown in Fig. 6, Fig. 8 is an elevation of the inner guide plate, Fig. 9 is a central transverse section through the parts shown in Fig. 8, Fig. 10 is a detail of the inner slide plate, Fig. 11 is an end view of said plate, Fig. 12 is a detail showing the outer slide plate in plan and in end elevation, Fig. 13 is a plan view of a spider, Fig. 14 is a plan view of a work-holding plate, Fig. 15 is a plan view of a nut.

My improvements contemplate a construction in which two lathe head portions or lathe heads, each having the same structural details and embodying novel features, are employed and driven from a common source of power,—one of said lathe head portions or lathe heads serving to balance the other during the operation of the mechanism. The two lathe head portions of the duplex lathe head, being the same in construction, it is unnecessary to describe all the details of each separately.

The head stock of a lathe is represented at 1 and in the present instance is shown as having a shape approximately that of an inverted letter U. The head stock may be secured to the base portion of a lathe in any suitable manner and the lower portions of its upright member are provided with bearings for a horizontal shaft 2, to which a pulley 3 is secured (between the upright members of the head stock) and this pulley is intended to receive flexible driving means from a suitable source of power. The shaft 2 is provided at its ends with shanks 4 on which gears 5, 5, are keyed and secured by screws 6, said gears being intended to drive my improved lathe heads, as hereinafter described.

The inner end portions of two horizontal rods 7 are mounted in suitable holes in the upper portions of the side members of the head stock 1 and project laterally from the same. Each of these rods is provided at its inner end with a shank 8 on which a nut 9 is threaded, and between these nuts and the inner faces of the upright members of the head stock, disks or washers 10 are disposed. Set screws 11, passing through the upper portion of the head stock, enter suitable recesses in the rods 7 and prevent the latter from turning. The head stock is provided with annular projections which form sleeves 12 surrounding the rods 7 and these sleeves form bearings for gears 13 which receive motion from the gears 5. Each rod 7 is made with an enlargement, forming a shoulder 14, between which and the adjacent sleeve or bearing 12, an inner race ring 15 is clamped when the nut 9 is tightened. An outer race ring 16 enters a recess in the outer face of the adjacent gear 13 and a recess in the inner face of a driving plate 17 and between the rings 15 and 16, balls 18 are disposed. Each ring 16 may be clamped to the drive plate by set screws 19. Each driving plate 17 carries a flanged guide plate 20, which, in effect, constitutes a part of said driving plate. The plates 17 and 20 and gear 13 may be rigidly secured together by means of screws 21 and dowels 22, as shown in Figs. 8 and 9. The flanged guide plate 20 enters guides 23 of a slide plate 24, the latter having an elongated opening 25 through which the rod 7 passes. A plate 26 is movable with the plate 24 but is spaced therefrom by means of interposed sleeves 27, and bolts 28 are passed through said sleeves and plates and the plate 26 is provided on its rear face with parallel flanges forming an elongated guideway 29 which is disposed at right angles to the sliding connection of the plate 20 with the slide plate 24.

The outer end of the rod 7 is provided with a rigid, elongated head 30 and this head is disposed between the plates 24 and 26. The elongated head 30 is made with a dove-tail groove 31 and provided with end members 33 and 34 in which a screw 35 is swiveled. The screw 35 passes through a dove-tail fulcrum block 36 mounted in the groove 31, and is provided at one end with a shank 37 of angular cross section to receive a wrench or key to facilitate the turning of said screw to adjust the fulcrum block relatively to the axis of the rod 7. A pintle 38 projects from the block 36, and on this pintle a pivot member 39 is mounted to enter the guideway 29 of the front plate 26.

A spider 40 is secured to and spaced from the front plate 26 and a nut 41 is located between said front plate and spider, said nut having hub portions 42 mounted in holes 43 and 44 in the spider and front plate respectively so that said nut will have a swivel mounting. The threaded interior of the nut 41 receives a threaded barrel 45 projecting from a removable face or work-holding plate 46, and a screw 47 passes through the barrel 45 and outwardly from the plate 46 to enter and center the work. The face plate 46 is also provided with a plurality of pointed pins 48, the butt ends of which may enter sockets 49 in the spider. The work may be applied to the removable face plate 46 either before or after inserting the threaded barrel 45 into the nut 41, and it is apparent that when the threaded barrel 45 is inserted into the nut 41, the turning of the latter (preferably with the use of a suitable tool) will cause the work-holding face plate to be tightly clamped in position on the spider 40.

Any suitable tool-holding devices may be employed on the lathe to properly hold a tool or tools in position to engage the work carried by either or both of the turning head portions.

With the construction and arrangement of mechanism hereinbefore described, it is apparent that when the pulley 3 is rotated, the connected plates 24 and 26 will be caused to reciprocate together and as the whole rotates, there will be a movement of the said plates and the work holding devices in a direction at right angles to the reciprocating movements of said plates relatively to the drive plate, by reason of the sliding connection with the pivot member 36 carried by the fulcrum block 30 which is secured (adjustably) to the rod 7, and that therefore the rotation of the turning head will cause the work holding means to travel in an elliptical path so that the application of a suitable tool to the work will effect the marking or cutting of an elliptical object. By adjusting the fulcrum block 36 in the fixed head on the rod 7, the travel of the work holding means may be adjusted to mark ellipses of different sizes and different relative dimensions.

The two turning heads are so mounted on the head stock that the adjusting devices for both fulcrum blocks will be accessible from the same side of the machine.

It will be readily noted that the two heads will rotate simultaneously and work may be carried upon both heads or upon either head alone so that two pieces of work may be turned or shaped at the same time, and the two fulcrum blocks may be given the same or different adjustments so that the two pieces of work may be given the same or different forms.

Having fully described my invention what I claim as new and desire to secure by Letters-Patent, is:—

1. In mechanism of the character described, the combination of a fixed supporting rod, a head on the outer end of said rod, a driving member rotatably fitted on the rod at the inner side of the head, a sliding plate fitted to the driving member and held between the said member and the head, a pivot member mounted on the head; a second slidable plate engaged with the pivot member for sliding movement at a right angle to the sliding movement of the first plate, the second plate being secured to the first plate and bearing against the outer side of the head, and a work holder secured to the outer face of the second plate.

2. In mechanism of the character described, the combination of a fixed support, a driving member rotatably mounted on the fixed support, means for rotating said driving member, a back plate slidingly connected with said driving member and fitting over the fixed support, a front plate rotatable with said back plate and having a guideway disposed at right angles to the direction of sliding movement of the back plate, a head on the fixed support between back plate and the front plate, a pivot plate entering the guideway in the front plate, a fulcrum block mounted in the head and having a pintle carrying the pivot plate, and means for adjusting said fulcrum block relatively to the axis of rotation of the driving means.

3. In mechanism of the character described, the combination with a driving member, and means for rotating the same, of front and back plates spaced apart and secured together, said plates having transverse sliding connection with the driving member, normally fixed devices disposed between said plates, means for connecting work with said front plate, said normally fixed devices including a head member and a fulcrum member carried by said head member, a member pivoted on the fulcrum member, parallel guides on the front plate to receive the pivoted member, and means for adjusting the position of the fulcrum member and pivoted member connected therewith.

4. In mechanism of the character described, the combination of a fixed rod, a fixed head on said rod, front and back plates spaced apart and secured together, one of said plates having an elongated slot for the passage of said fixed rod, and the head on said fixed rod disposed between said plates, driving means, means effecting sliding connection of the back plate with the driving means, said front plate having a guide way at right angles to the sliding connection of the back plate with the driving means, an adjustable member carried by the fixed head, a member pivoted to said adjustable member and entering the guideway of the front plate, and work holding means connected with the front plate.

5. In mechanism of the character described, the combination with an inverted U-shaped support, of two turning heads mounted on said support in horizontal alignment with each other, each of said turning heads comprising rotatable and sliding members and means cooperable therewith to effect movement in an elliptical path of work carried by said turning head, gears connected with the two turning heads, a shaft mounted in said support below the turning heads, gears secured to said shaft and meshing respectively with the gears of the respective turning heads, and means on said shaft between the sides of the support whereby said shaft may be driven to operate the two turning heads simultaneously.

In testimony whereof, I have signed this specification in the presence of two subscribing witnesses.

LEWIS M. WALKER.

Witnesses:
 HOWARD ANGELL,
 ALBY E. WOOD.